United States Patent [19]

Pass et al.

[11] 3,741,236
[45] June 26, 1973

[54] FLUID CONTROL AND CONDITIONING UNITS FOR INSERTION IN FLUID LINES

[75] Inventors: Peter John Pass; Douglas Wesley Carr, both of Shipston-on-Stour; Rogers Knight, London; Ronald Gelder, Moreton Morrell; Leslie William Smith, Shipston-on-Stour; Leonard Frederick Harris, Shipston-on-Stour; Karel Leon August Van Bastelaere, Shipston-on-Stour, all of England

[73] Assignee: C. A. Norgren Limited, Shipston-on-Stour, Warwickshire, England

[22] Filed: Sept. 13, 1971

[21] Appl. No.: 180,037

[30] Foreign Application Priority Data
Sept. 21, 1970   Great Britain .................. 44,876/70

[52] U.S. Cl. ............................... 137/269, 137/798
[51] Int. Cl. ............................................. F16k 11/10
[58] Field of Search ................... 137/269, 271, 798, 137/802, 495; 251/369; 285/18, 12, 175, 176, 169, 177, 61

[56] References Cited
UNITED STATES PATENTS

| 3,513,876 | 5/1970 | Tarbox .......................... 137/269 X |
| 3,589,387 | 6/1971 | Raymond ........................... 137/271 |
| 3,180,357 | 4/1965 | Galley ........................... 137/495 X |
| 3,117,587 | 1/1964 | Willinger ....................... 137/271 X |
| 1,827,470 | 10/1931 | Harrison et al. ..................... 137/269 |
| 3,024,801 | 3/1962 | Carls ................................ 137/271 |
| 3,371,682 | 3/1968 | Flint .............................. 137/271 X |

Primary Examiner—Henry T. Klinksiek
Assistant Examiner—Robert J. Miller
Attorney—Sheridan, Ross and Fields

[57] ABSTRACT

A fluid control or conditioning unit with inlet and outlet ports, and more particularly a filter, pressure regulator and/or mist lubricator incorporated in a compressed air line, adapted to be positioned between supply and delivery pipes; and means having ports which register with those in the unit and are adapted to receive the ends of the pipes and act as coupling means therefor so that the ends of the pipes have no direct connection with the unit. The unit has plane external faces into which its inlet and outlet ports open and the ports in the said means also open into plane faces which oppose those of the unit, provision being included for sealing the ports of the unit with those of the coupling means and for securing the unit in sealed relation to the coupling means. Thus one and the same unit may be used with pipe ends of different size of type, and more particularly in the case of screw-threaded pipe ends and screw-threaded ports in the coupling means, one and the same unit may be used with threaded pipe ends of different size or type of thread by selection of the coupling means from a range. The combination is preferably such that the unit or one of a plurality of units in series may be withdrawn substantially by movement perpendicular to the axis of the ports without moving or removing the coupling members and preferably while a valve unit, likewise having plane faces into which its ports open, remains fixed to the coupling means for shut-off of flow during removal of a unit.

18 Claims, 8 Drawing Figures

FLUID CONTROL AND CONDITIONING UNITS FOR INSERTION IN FLUID LINES

This invention relates to fluid control and conditioning units, such as valves, filters, pressure regulators, mist lubricators and the like, of the type which are adapted to be arranged in a fluid line, and more particularly a compressed air line, by coupling opposite sides thereof to pipe ends in the line. These units are customarily formed with inlet and outlet ports on opposite sides, the ports being threaded and forming the female components for connection with the male screw ends of pipes in the line.

The size of pipe and the diameter and type of thread on the pipe to which a unit or units is or are to be fitted may vary considerably. For example, any such unit may require female components with an internal thread diameter to be chosen from any four sizes from between one-fourth inch and three-fourths inch and perhaps from four types of thread, e.g., B.S.P. taper, B.S.P. parallel B.S.P. parallel with spot face and N.P.T. (American thread). Therefore the manufacturer may have to stock perhaps sixteen versions of any one unit, each differing from the other only in the diameter or type of the port threads, and where a still wider range of sizes and type of thread is involved a still larger number of different units may need to be kept in stock. The range in question may be of a higher or lower value.

The invention aims at providing a modular construction of unit which may be readily adapted to any selected size or type of pipe thread within an overall range, although the advantages aimed at are not confined to screw thread couplings and may be obtained with other types of couplings.

The invention accordingly provides a fluid control or conditioning unit for connection between supply and delivery pipes, in which inlet and outlet ports of the unit open respectively into oppositely facing external sealing faces, in combination with pipe coupling means having ports which register with those in the unit and are adapted to receive the ends of the pipes so that the ends of the pipe have no direct connection with the unit, the ports in said means opening into sealing faces which oppose those of the unit, means for sealing the ports of the unit with those of the said pipe coupling means and means for securing the unit in sealed relation to said pipe coupling means.

More specifically the invention provides a fluid control or conditioning unit for connection between supply and delivery pipes, in which inlet and outlet ports of the unit open respectively into oppositely facing external sealing faces, in combination with pipe coupling means having screw-threaded ports which register with those in the unit and are adapted to receive screw-threaded ends of the pipes, the ports in said means opening into sealing faces thereof which oppose those of the unit, means for securing the coupling means and the unit and means for sealing the ports of the unit with those of the coupling means, whereby one and the same unit may be secured to threaded pipe ends of different size or type by selection of the coupling means from a range.

Such sealing faces may be plane faces and one or both of each pair of plane opposing faces may house an annular sealing ring, e.g., in an annular groove, around its port for sealing communicating ports in the coupling means and the unit, and this promotes sealing with little or no relative axial movement between the unit and the coupling means.

The unit and the coupling means may be secured with the plane faces of the unit and opposed plane faces of the coupling means in close or contacting relationship sealed to one another around the ports and the unit arranged to be releasable from the coupling means and withdrawable therefrom by displacement perpendicularly to the axis of the ports in the unit while the plane faces of the unit and the plane faces of the coupling means remain in close or contacting relationship so that no unscrewing of the unit and consequent axial displacement thereof is required for the removal of the unit. Thus an axially compact assembly is possible and this can be constructed so that a unit can be removed, e.g., for cleaning, inspection or repair, with little or no displacement of the coupling means and the pipes and little or no displacement of the unit in the axial direction of its ports.

The coupling means may comprise separate members, e.g., in plate-like form, each with a screw threaded through-port for axial alignment with axially aligned ports in the unit and for direct sealing with the unit, although these members may be fixedly mounted and virtually form one component.

The ports in the coupling means need not necessarily connect with the pipes in line with the axis of the ports in the unit, but could be formed to connect with the pipes at an angle or abaxially in relation to the axis of the ports in the unit, or separate mounting members with screw-threaded ports could be connected and sealed to members having plain ports.

The securing means may exert a clamping action on the unit and a corresponding compressive action on the sealing rings, e.g., by the provision of appropriate securing means such as tie bolts.

It is frequently desired to arrange a number of different units, say an air filter unit, a pressure regulator unit and/or a fog-lubricating unit in series in the compressed air line. Two or more such units may be arranged in line with their ports sealed in axial alignment; the coupling means providing plane ported faces one at each end of the plurality of units with their sealing ports in the same alignment and their faces facing the units in the same parallelism.

A valve may be provided having sealing faces into which its ports open, the valve being secured with its ports registering with the ports in the coupling means and the unit or units and sealed to the said ports so that flow through the unit or units can be stopped or controlled, e.g., when a unit is to be inserted or withdrawn.

If it is desired that the sealing means exert a clamping action on the unit or units there will in general be sufficient freedom for longitudinal movement in the pipe line to enable the units to be clamped or released. The amount of relative axial movement, if any, necessary for the insertion or withdrawal of a unit need be only very small and the coupling means formed as separate terminal members may be mounted to have some small movement in the direction of the axis of the ports in the unit or units.

The coupling members may be designed for bolting to a suitable support surface and one or both of them may be permitted some movement in the axial direction of an assembly, e.g., by providing slots for their fixing bolts.

The coupling members need be the only variables in the system, and can be economically manufactured so as to be capable of being compactly stacked for stock purposes in different groups from which a selection can be made according to the size and type of pipe screw to be accommodated.

There is no difficulty in aligning coupling members and units, and where two or more units are mounted between two end coupling members and secured face-to-face, the overall length is considerably reduced as compared with normal design where coupling connections have to be interposed as projections between units, yet the coupling members and the units can be effectively sealed and may be formed into a tight assembly by clamping them together. Where the units are of a plastics material they may be placed in a state of compression by the clamping operation and the bursting strength increased.

The coupling members may be constructed with suitable mounting holes.

The modular construction also tends to open the way to a wider choice in the materials used for the units. In many cases it is highly desirable for the units to be basically produced of a plastics, and more particularly of a thermoplastics, material, but the need to provide screw threads in the units often militates against the use of such materials. When however, the units are constructed in the modular fashion according to this invention, and inasmuch as they require no threads for connection in the pipe line, they may be moulded or otherwise formed of such materials and the members through which the screw connections are made to the pipes may be made of any suitable metallic material.

Especially when a series of units are to be secured in series, the overall length of the series and the space occupied thereby can be reduced and the more accurately calculated because of the elimination of projecting coupling connections and of the avoidance of thread tolerances.

The co-operating faces of the units and the coupling members may be of a square or rectangular oblong form and the units may be designed on a square or rectangular section pattern or at least assembly bodies thereof so constructed, but the said co-operating faces and the general external shape of the unit may be of any suitable formation, e.g., with side bosses for the tie rods where such are employed, or so that the front faces of the units are rectangular to provide a neat generally rectangular form of the assembly as seen from the front face thereof.

The units may, if desired, be mounted squarely in relation to a base, wall or manifold and can be readily individually detached.

If a diameter differential between co-operating ports in a coupling member and a unit would interfere with a desired flow, suitable inserts, e.g., of plastics, could be provided, if desired appropriately shaped to provide a gradual change from one diameter to another.

In order that the invention may be more clearly understood, reference is hereinafter made to the accompanying drawings, in which embodiments of the invention are illustrated by way of example with separate coupling members and in which FIG. 1 shows an assembly of units according to the invention and FIG. 2 a face view and FIG. 3 sectional elevation of one of the coupling members.

Figure 1:
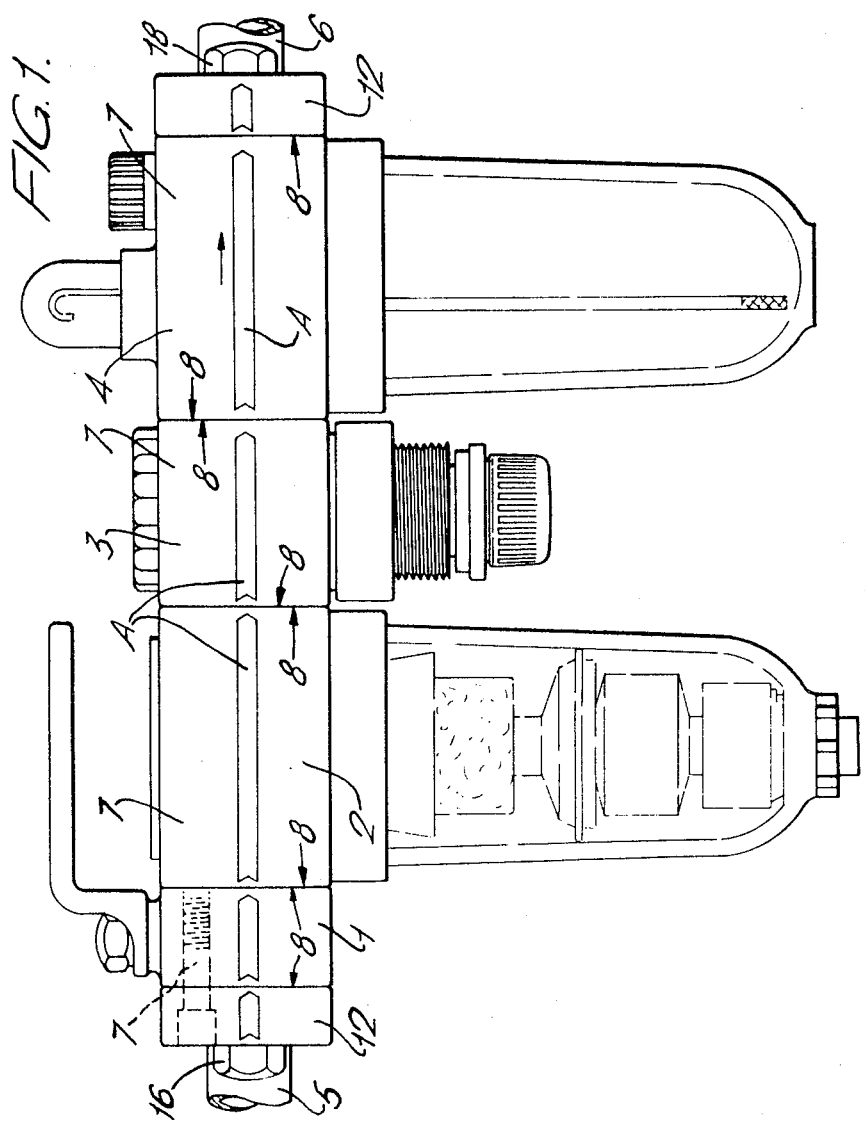

In the assembly, FIG. 1, the unit 1 is a shut off valve, the unit 2 an air filter, the unit 3 a pressure regulator and the unit 4 a mist-lubricator. Insofar as concerns the working of these units, they are constructed along conventional lines. They may work in the manner of the well known Norgren units for air-filtration, pressure regulating and mist-lubrication.

The units are shown assembled in an air line, being connected to an inlet pipe 5 and an outlet pipe 6.

Figure 4:
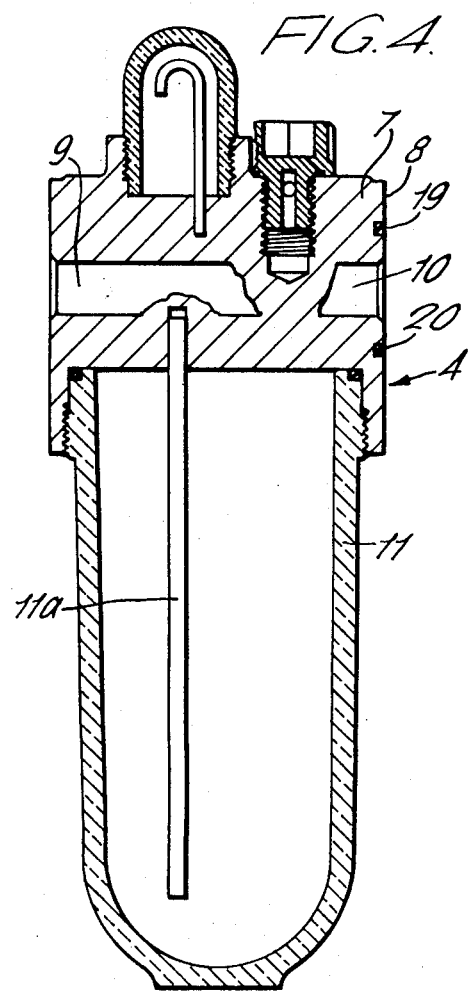
FIG. 4 shows a unit in the form of an oil-mist lubricator.
Figure 5:
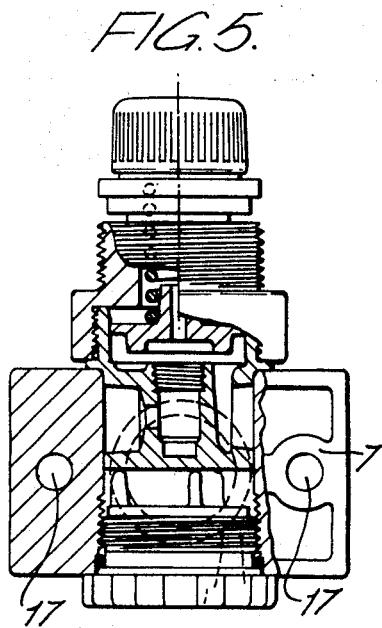
FIG. 5 is a section of a pressure regulator.

The body 7 of each unit is in the illustrated embodiment, of a generally rectangular section. The rectangular cross-section of the body 7 of the regulator unit is shown in FIG. 5 and the body of each other unit is of the same generally rectangular form. Each said unit is formed with rectangular plane end faces 8. FIG. 4 shows by way of example a mist lubricator the body 7 of which is provided with such plane end faces 8. The unit is formed with an inlet port 9 and outlet port 10 which are of plain bore (unthreaded) form and open into the faces 8. The other units are similarly formed in this respect. The working of the lubricator is well known and need not be described in detail, the air flow from inlet to outlet having the effect of sucking lubricant from the bowl 11, through a syphon tube 11a and delivering an oil mist which can be supplied to various parts of machinery to be lubricated. The air filter unit 2 again may operate conventionally in delivering filtered air through the pressure regulator unit 3 to the lubricator.

The regulator unit may comprise a loading spring which is unloaded when the regulator valve is closed but which by means of an adjusting screw can be loaded to open the valve through a diaphragm or piston, the air pressure on the side of the diaphragm or piston opposite the spring being connected to the outlet port so that regulated pressure is exerted on the diaphragm or piston compressing the adjusting spring until the load exerted by the spring is equal to the load exerted by the regulated pressure.

Figure 2:
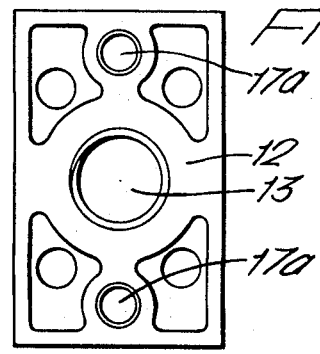
Figure 3:
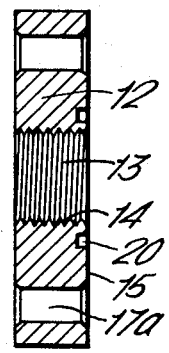

Any such unit may be secured between end coupling plates 12 (hereinafter described) or as shown in FIG. 1, a series of units may be secured face-to-face in sealed engagement with one another by means of the end coupling plates 12. The end coupling plates 12 are of rectangular shape (see FIGS. 2 and 3) and approximate to the cross-section of the body 7 of each unit. They may be releasably bolted to a suitable support.

The coupling plates are each provided with a through-port 13 which is screw-threaded at 14 through the whole or part of its length and forms a female screw to receive a screwed end of the inlet pipe 5 or outlet pipe 6. Each coupling plate has plane faces 15 one of which faces the face 8 of the adjacent unit when adjacent faces 8 of the units are in face-to-face relation with each other. The units have no screw connection to the inlet or outlet pipes, but only the coupling plates 12 screw to the pipes.

The unit or units is or are secured between the coupling plates by means of bolts 16 which pass through holes 17, see FIG. 5 which show the holes in the pressure regulator, similar holes being arranged, to register with those in the pressure regulator, in the other units and the coupling plates being also provided with corresponding holes 17a. The bolts may be headed bolts secured by nuts 18, or bolts secured by nuts at each end.

Between each pair of co-operating faces 8 and 8 or 8 and 15 a seal 19 is provided which may take the form of an O-ring or be of other suitable form and is set into an annular groove 20 in one of the co-operating faces or retained by other suitable means.

Thus, when the bolts 16 are secured, a tight axial assembly of coupling plates and units is obtained with the elements of the assembly in face-to-face relationship if desired with the sealing rings compressed, so that little or no change in the axial flow direction occurs across the junction between the units and the coupling members or between adjacent units.

The units may be formed with arrow-like formations A to indicate flow direction. The assembly may be turned through 180° about a vertical axis to provide reverse flow direction and arrow-like formations may be provided on opposite faces for indicating reverse flow as viewed from the same aspect when the assembly is so turned.

Although the tie rods are shown in the drawings with their axes as seen in end view at 3 o'clock and 9 o'clock on a horizontal line and a unit may be turned through 180°, they may be otherwise arranged, e.g., on a diagonal line at say 2 o'clock and 8 o'clock and so that if two further holes are provided in the unit, e.g., in the regulator unit clear of the operating mechanism thereof, the unit may be turned through 90°. This may be desirable, e.g., in the case of the regulator to bring the control screw thereof into a horizontal and more convenient position for handling.

Figure 6:
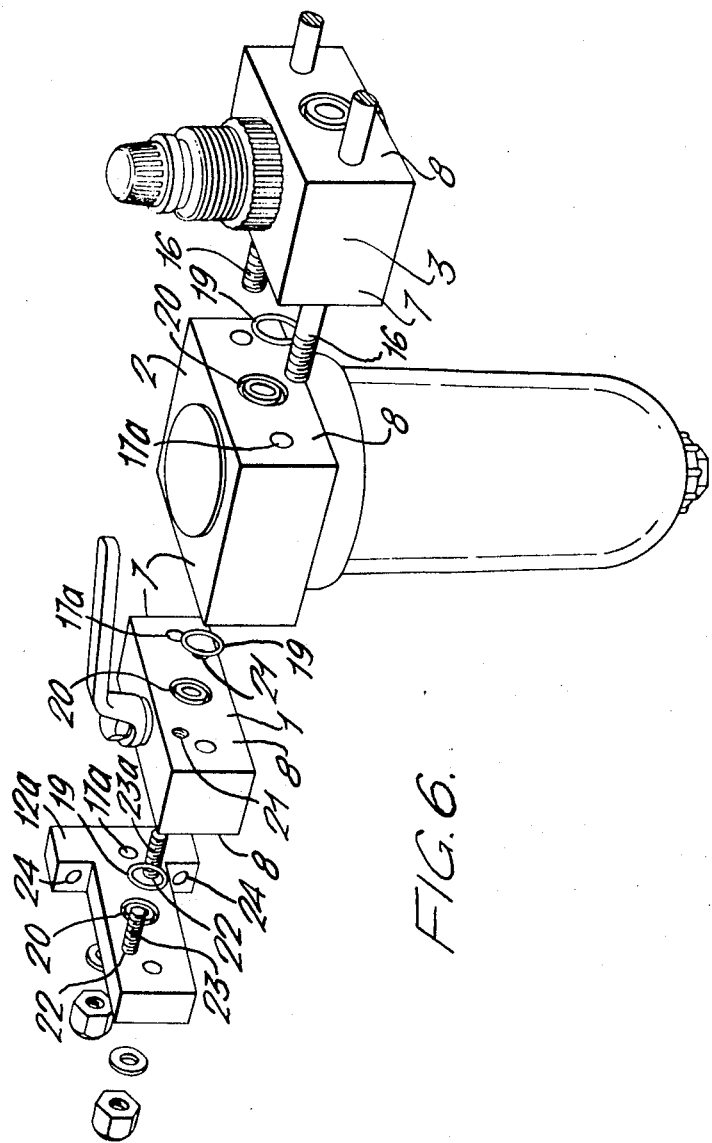
FIG. 6 is an exploded view with a modified form of the coupling members.
Figure 6A:
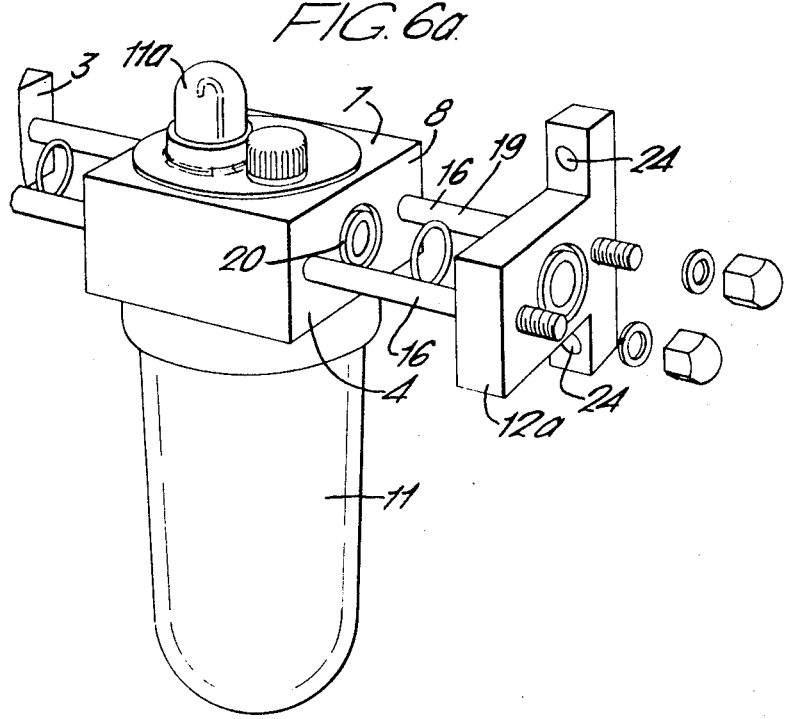

In the exploded view, FIG. 6, 6a in which FIG. 6 is the left hand end of the assembly and FIG. 6a the right hand end, the parts corresponding to those shown in the figures previously referred to are given the same reference numerals. This figure shows the shut-off valve unit 1 as having threaded holes 21 and the coupling members 12a as having registering holes 22 so that the valve unit can be bolted to the coupling member 12a by bolts 23 and 23a. Thus the valve can be closed and remained fixed to a said coupling member when other of the units are required to be removed.

The coupling members in this figure are of a tee-form with holes 24 in the Tee head to enable said members to be bolted to a suitable back mounting. The holes 24 could be in the form of slots to receive fixing bolts and permit displacement of the members in the axial direction of the assembly.

Figure 7:
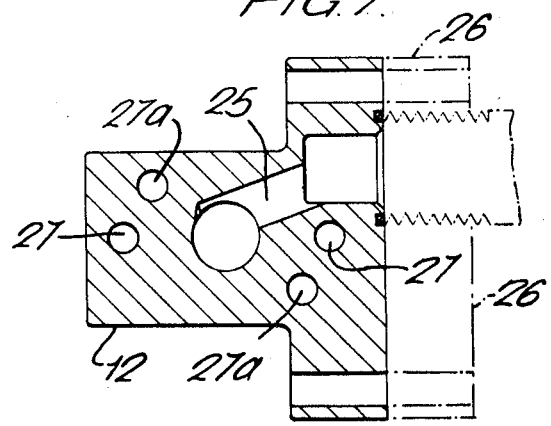
FIG. 7 shows another form of coupling member which is adapted to be used with an associated mounting member or sub-base which is threaded to receive the pipe.

In FIG. 7 a Tee type of coupling member is shown with an oblique flow passage 25. This is suitable where an inlet and/or outlet air line is more conveniently arranged by being brought into a mounting plate or sub-base 26 instead of directly axially into the coupling member. The sub-base may be in any suitable form, e.g., a casting. Although the screw-end of the pipe is shown in FIG. 7 co-axial with the adjacent end of the port in the coupling member, the screw-end of the pipe may enter the mounting plate or sub-base at an angle, e.g., a right angle or abaxially to that end of the said port and make a suitable angular junction therewith. In such a case separate mounting plate members or sub-bases may be provided from which a selection may be made according to the size and thread of the pipe to be accommodated. The bolt passages are indicated at 27 and this figure also shows that they may be on a diagonal line, see the passages 27a if the units of the assembly have similarly arranged tie bolt passages.

It should be observed that when the clamping bolts are tightened there may be some shortening of the overall length of the assembly, and while one pipe may be secured in position after clamping the assembly, this would generally not be necessary even in embodiments such as are shown FIG. 1 to 6 as there is usually a certain amount of longitudinal movement allowed in a pipe line. However, the sealing rings may be compressed sufficiently by the insertion of the unit perpendicularly to the axis of the ports therein, in which case the coupling means may be fixed or form a unit.

In the forms depicted in FIGS. 1 to 6, the air line entry port is in the axial direction, but the entry or exit port of the coupling member may be at the top or bottom or from either side of the coupling member. It is not necessary that the coupling member at the outlet end should be of the same form as that at the inlet end.

It is to be understood that the assembly may be arranged in other than a horizontal position, e.g., vertically or at a suitable inclination.

In a multiple unit assembly, and with the aim of facilitating the removal of any selected unit, one of the units, e.g., a medial unit may have threaded passages and the tie rods made in two sections with threaded adjacent ends screwed into the said unit, but various ways are available of securing the units and the coupling members together.

What is claimed is:

1. A fluid control or conditioning unit for connection between supply and delivery pipes, comprising inlet and outlet ports and oppositely facing external sealing faces into which the said ports open respectively, in combination with means having ports which register with those in the unit and are adapted to receive the ends of the pipes and act as coupling means therefor so that the ends of the pipes have no direct connection with the unit, the ports in said coupling means opening into sealing faces which oppose those of the unit, means for sealing the ports of the unit with those of the coupling means, and means for securing the unit in sealed relation to the coupling means.

2. A fluid control or conditioning unit for connection between supply and delivery pipes having screw-threaded ends, comprising inlet and outlet ports and oppositely facing external sealing faces into which said ports open, in combination with pipe coupling means having screw-threaded ports which register with those in the unit and are adapted to receive the screw-threaded ends of the pipes, the ports in said coupling means opening into sealing faces thereof which oppose those of the unit, means for securing the unit and the coupling means together and means for sealing the ports of the unit with those of the coupling means, whereby one and the same unit may be used with threaded pipe ends of different size or type of thread by selection of the coupling means from a range.

3. The combination according to claim 1, in which said sealing faces are plane faces and the unit and the coupling means are secured with the plane faces of the unit and the opposed plane faces of the coupling means in close or contacting relationship, said sealing means sealing said faces to one another around the ports, the unit being releasable from the coupling means and withdrawable therefrom by displacement perpendicularly to the axis of the ports in the unit.

4. The combination to claim 1, in which the unit is any one of an air filter unit, an air-pressure regulating unit or a mist lubricating unit incorporated in a compressed air line.

5. The combination according to claim 1, incorporating a plurality of said units in series, said units being an air filter unit, and an air-regulating and mist lubricating unit all with their ports in axial alignment.

6. The combination according to claim 1, comprising at least two such units having sealing faces which are plane and in parallelism and their ports in axial alignment, the coupling means having sealing faces which are also plane and in the same parallelism and with their ports opening into said plane faces thereof in the same alignment.

7. The combination according to claim 1, comprising a valve having inlet and outlet ports and having opposite facing sealing faces into which said ports respectively open, means for securing the valve with its ports in alignment with the ports in the coupling means and the adjacent unit and sealed to the said ports, so that flow through the unit can be stopped or controlled.

8. The combination according to claim 7, in which the valve is secured to the coupling means so that a unit can be removed while the valve remains connected to the coupling means.

9. The combination according to claim 1, in which the coupling means comprise separate members mounted one at opposite ends of at least one of said units.

10. The combination according to claim 9, in which the coupling members serve as mounting members.

11. The combination according to claim 1 in which at least one of said units and the coupling members are connected by tie rods.

12. The combination according to claim 9, in which at least one of the coupling members has a through-port which is screw threaded and is in alignment with the ports in the unit.

13. The combination according to claim 9, in which at least one of the coupling members comprises a plane ported member associated with a separate mounting member having a port which is screw-threaded to form the female component of the screw pipe connection and permits entry to or outlet from the coupling member in a direction angularly or abaxial in relation to the axis of the ports in at least one of the units.

14. The combination according to claim 9, in which the coupling members are of plate-like form for compact stacking with others.

15. The method of assembling a fluid control or conditioning unit in a fluid line, wherein the unit has ports opening into external oppositely facing sealing faces thereof, which consists in selecting pipe coupling means having ports adapted to conform respectively to the end of a supply pipe and the end of a delivery pipe and opening into external sealing faces of said coupling means, connecting the unit and the said coupling means so that each sealing face of the unit faces a sealing face of the said coupling means and so that the ports of said coupling means are sealed in relation to the adjacent ports in the unit, and securing the pipes to the ports in said coupling means to facilitate connecting a standard unit to pipes of different size or type by coupling means selected from a range of sizes.

16. The method according to claim 15, in which the ports in the coupling means are formed by screw-threaded bores and the co-operating ends of the pipes are correspondingly externally screw-threaded.

17. The method according to claim 15, in which said unit is releasably secured and said unit is withdrawable substantially soley by displacement perpendicular to the axis of the ports while the coupling means remain in connection with the pipes.

18. The method according to claim 16 in which the coupling means are adapted for screwing to at least one of the pipes in a direction at an angle to, or abaxial to, the axis of the ports in the unit.

\* \* \* \* \*